US009579758B2

(12) United States Patent
Jia

(10) Patent No.: US 9,579,758 B2
(45) Date of Patent: Feb. 28, 2017

(54) WORKPIECE TURNING-OVER DEVICE

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventor: Jian-Shi Jia, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

(*) Notice: Subject to any disclaimer, the term of this patent is extended or adjusted under 35 U.S.C. 154(b) by 120 days.

(21) Appl. No.: 14/522,138

(22) Filed: Oct. 23, 2014

(65) Prior Publication Data
US 2015/0209923 A1  Jul. 30, 2015

(30) Foreign Application Priority Data

Jan. 24, 2014  (CN) .......................... 2014 1 0034377

(51) Int. Cl.
*B23Q 16/06* (2006.01)
*B23Q 1/76* (2006.01)
*B23Q 1/52* (2006.01)
*B23Q 3/06* (2006.01)
*B23Q 17/00* (2006.01)

(52) U.S. Cl.
CPC ............. *B23Q 1/763* (2013.01); *B23Q 1/525* (2013.01); *B23Q 3/061* (2013.01); *B23Q 3/064* (2013.01); *B23Q 17/003* (2013.01)

(58) Field of Classification Search
CPC .......... B23Q 1/522; B23Q 1/525; B23Q 1/64; B23Q 1/76; B23Q 1/763; B23Q 16/026; B23Q 16/04; B23Q 16/043; B23Q 16/06; B23Q 3/061
See application file for complete search history.

(56) References Cited

U.S. PATENT DOCUMENTS

| | | | | |
|---|---|---|---|---|
| 1,338,095 A | * | 4/1920 | Reid ......................... | B23Q 1/28 144/129 |
| 1,737,002 A | * | 11/1929 | De Vlieg ............... | B23Q 16/04 33/569 |
| 2,356,864 A | * | 8/1944 | Martin ................... | H05K 13/02 269/243 |
| 2,704,672 A | * | 3/1955 | Wiltsie ................... | B23Q 16/06 192/24 |

(Continued)

FOREIGN PATENT DOCUMENTS

TW          M439535 U1      10/2012

*Primary Examiner* — Joseph J Hail
*Assistant Examiner* — Tyrone V Hall, Jr.
(74) *Attorney, Agent, or Firm* — Zhigang Ma

(57) ABSTRACT

A workpiece turning-over device includes a mounting wall, a gear driving mechanism, and a rotation mechanism. The gear driving mechanism comprises a toothed bar and a driving member. The driving member is able to drive the toothed bar to move. The rotation mechanism comprises a sleeve and a gear. The sleeve is rotatably attached to the mounting wall. A supporting portion extends from the sleeve to secure the workpiece thereon. The gear is fixedly coiled around the sleeve, engaged to the toothed bar, and is able to rotate to rotate the sleeve fixed thereto, thereby allowing the workpiece to rotate.

20 Claims, 5 Drawing Sheets

(56) References Cited

U.S. PATENT DOCUMENTS

| | | | | |
|---|---|---|---|---|
| 3,572,174 | A * | 3/1971 | Lynn | B23Q 1/522 74/411.5 |
| 5,535,995 | A * | 7/1996 | Swann | B25B 1/2484 269/152 |
| 5,562,277 | A * | 10/1996 | Swann | B23Q 3/103 269/152 |
| 5,735,514 | A * | 4/1998 | Moore | B23Q 16/102 192/223.1 |
| 6,185,802 | B1 * | 2/2001 | Gruber | B23Q 1/5437 269/57 |
| 6,629,345 | B2 * | 10/2003 | Albeck | B23Q 3/061 269/900 |
| 7,346,969 | B2 * | 3/2008 | Huang | B23P 13/02 269/57 |
| 2006/0277734 | A1 * | 12/2006 | Daris | B23Q 3/061 29/38 C |
| 2007/0284209 | A1 * | 12/2007 | Chen | F16D 41/07 192/45.1 |
| 2009/0084203 | A1 * | 4/2009 | Li | G01M 99/007 73/865.3 |
| 2014/0165752 | A1 * | 6/2014 | Lee | B23Q 1/527 74/89.17 |

* cited by examiner

WORKPIECE TURNING-OVER DEVICE

FIELD

The present disclosure relates to devices used for turning-over workpieces during manufacturing, and particularly to a workpiece turning-over device applied in a production line for quickly and smoothly turning or flipping over workpieces.

BACKGROUND

Different surfaces of a workpiece need to be machined during mass production manufacturing. A device for turning-over these workpieces is needed.

BRIEF DESCRIPTION OF THE DRAWINGS

Implementations of the present technology will now be described, by way of example only, with reference to the attached figures.

DETAILED DESCRIPTION

Figure 1:
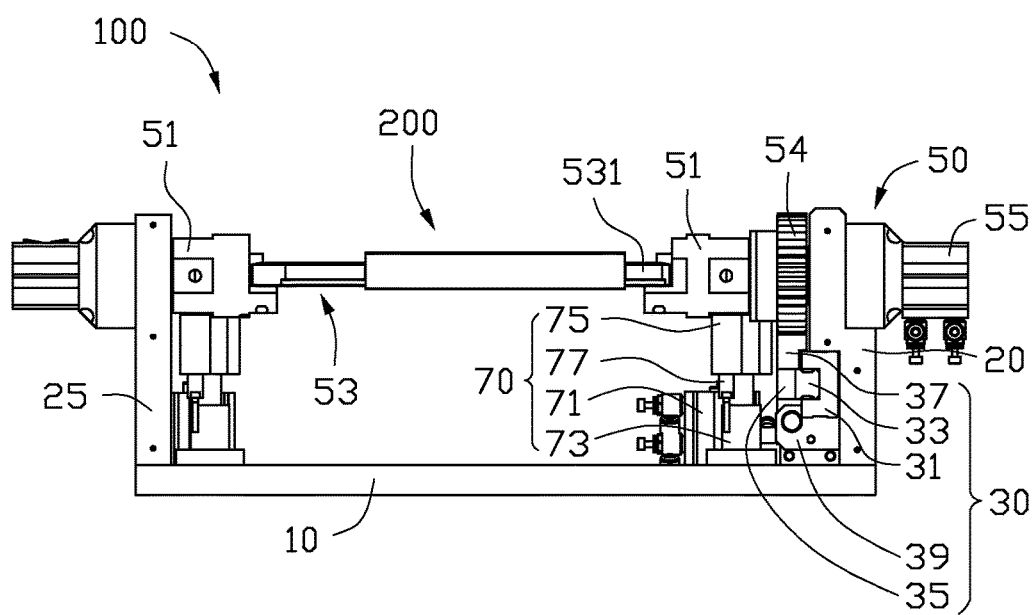
FIG. 1 is an isometric view of an embodiment of a workpiece turning-over device.

It will be appreciated that for simplicity and clarity of illustration, where appropriate, reference numerals have been repeated among the different figures to indicate corresponding or analogous members. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

FIG. 1 illustrates an embodiment of a workpiece turning-over device 100 for turning over a workpiece 200 to be processed. The workpiece turning-over device 100 includes a base 10, a first mounting wall 20, a second mounting wall 25, a gear driving mechanism 30, and at least one rotation mechanism 50. In at least one embodiment, the turning-over device 100 includes six rotation mechanisms 50. However, the number of the rotation mechanism 50 can be varied.

The first mounting wall 20 and the second mounting wall 25 are secured to two opposite ends of the base 10, and substantially parallel to each other. In at least one embodiment, each of the first and the second mounting walls 20, 25 is substantially perpendicular to the base 10.

Figure 2:
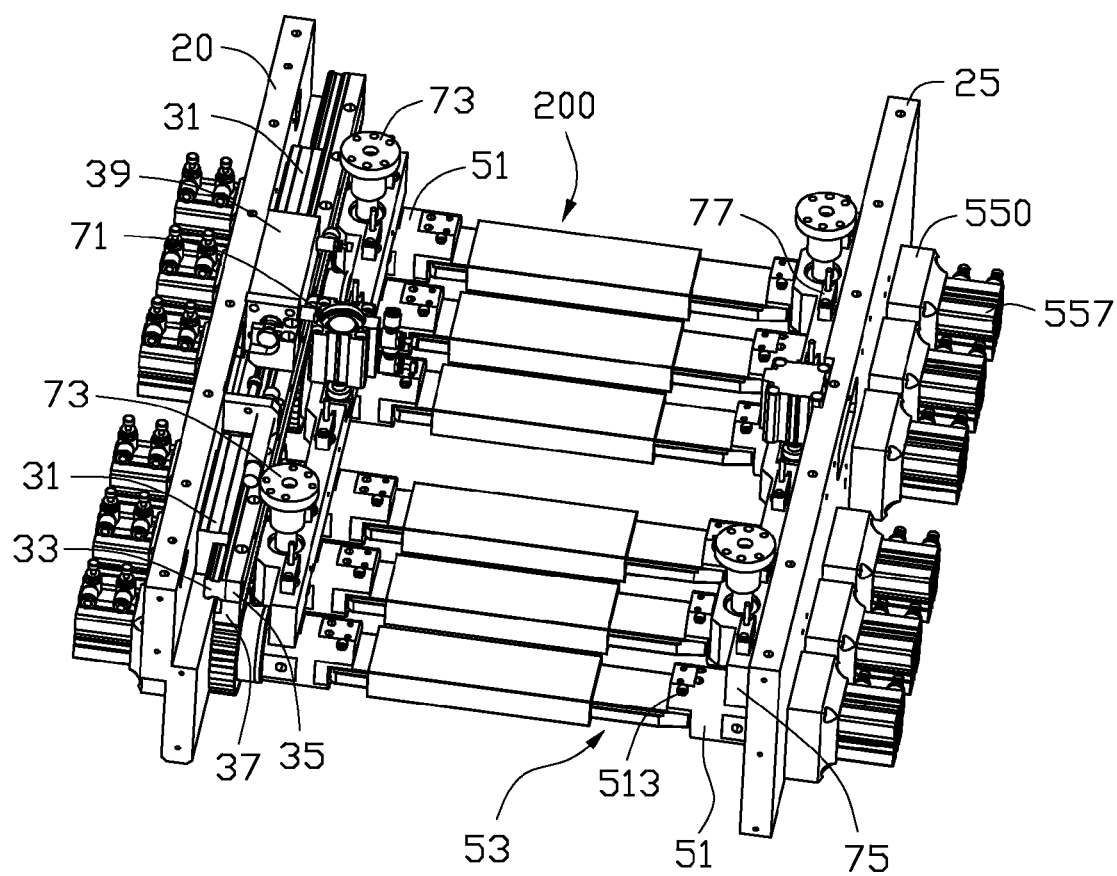
FIG. 2 is similar to FIG. 1, but showing a base disengaged from the workpiece turning-over device.

Also referring to FIG. 2, the gear driving mechanism 30 is arranged between the first and the second mounting walls 20, 25, and is adjacent to the first mounting wall 20. The gear driving mechanism 30 includes a toothed bar 37 and a first driving member 39. The first driving member 39 is able to drive the toothed bar 37 to move relative to the first mounting wall 20. In at least one embodiment, the first driving member is able to drive the toothed bar 37 to move parallel to the first mounting wall 20 and the base 10. In at least one embodiment, the first driving member 39 is a cylinder.

In at least one embodiment, the driving mechanism 30 further includes a sliding rail 31, a sliding rod 33, and a connecting block 35. The sliding rail 31 is connected to a surface of the first mounting wall 20 facing the second mounting wall 25. The sliding rod 33 is slidably received in the sliding rail 31. The connecting block 35 is connected to a surface of the sliding rod 33 opposite to the first mounting wall 20. The toothed bar 37 is connected to a surface of the connecting block 35 opposite to the base 10. The first driving member 39 is located on the base 10 and connected to the sliding rod 33, and is able to drive the sliding rod 33 and the connecting block 35 to slide along the sliding rail 31, thereby driving the toothed bar 37 to slide with the sliding rod 33.

Each rotation mechanism 50 includes two hollow sleeves 51, a loading block 53, and a gear 54.

The two sleeves 51 are rotatably inserted through the first mounting wall 20 and the second mounting wall 25. Also referring to FIG. 3-5, a supporting portion 512, substantially arcuate in cross section, extends from one end of each sleeve 51.

The loading block 53 is positioned on the two supporting portions 512, and the workpiece 200 is loaded and secured by the loading block 53. In at least one embodiment, each supporting portion 512 includes at least one positioning post 513. The loading block 53 includes two end portions 531 each defining at least one positioning hole 5311. Each positioning post 513 is able to insert into the corresponding positioning hole 5311, thereby positioning the loading block 53 on the two supporting portions 512 53. Each end portion 531 further includes a first inclined surface 5313. In an alternative embodiment, the loading block 53 can be omitted. In this case, the workpiece 200 is directly supported by the two supporting portions 512.

The gear 54 is fixedly coiled around the sleeve 51 which inserts through the first mounting wall 20, and is engaged to the toothed bar 37. When the first driving member 39 drives the toothed bar 37 to move, the gear 54 is able to rotate to cause the sleeve 51 fixed thereto to rotate. As such, the loading block 53 and the sleeve 51 which inserts through the second mounting wall 25 rotate to rotate the workpiece 200 supported by the loading block 53. Therefore, different surfaces of the workpiece 200 can be processed. In at least one embodiment, a one-way bearing 541 (shown in FIG. 5) is arranged between the gear 54 and the sleeve 51, and is able to control the sleeves 51 to rotate in only one direction.

Figure 4:
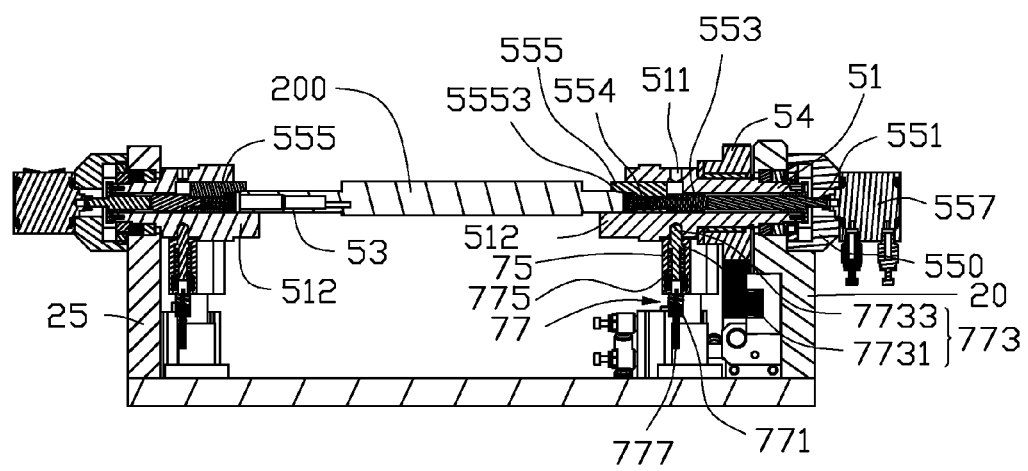
FIG. 4 is a cross-sectional view taken along line IV-IV of FIG. 3.
Figure 5:
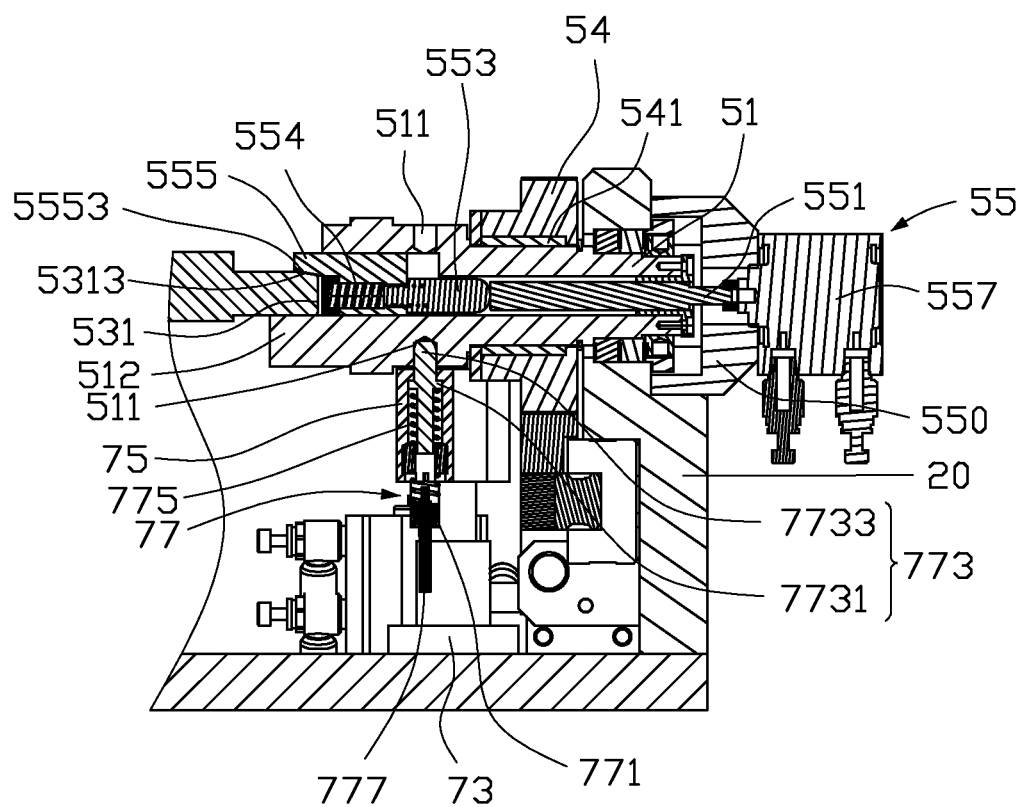
FIG. 5 is an enlarged sectional view of the workpiece turning-over device in FIG. 4.

Referring to FIGS. 4-5, in at least one embodiment, each rotation mechanism 50 further includes two urging assemblies 55. Each of the two urging assemblies 55 includes a connecting base 550, a first pushing rod 551, a second pushing rod 553, an urging member 555, and a second driving member 557. The first pushing rod 551, the second pushing rod 553, and the urging member 555 of each urging assembly 55 are movably received in the corresponding sleeve 51.

The two connecting bases 550 are secured to the first and the second mounting walls 20, 25, and aligned with the two sleeves 51. One end of each first pushing rod 551 passes through the corresponding connecting base 550, and is then connected to the second driving member 557. The other end of the first pushing rod 551 abuts against one corresponding second pushing rod 553. Each urging member 555 faces the corresponding supporting portion 512, and abuts against the second pushing rod 553. Each urging member 555 includes a second inclined surface 5553. When each second driving member 557 pushes the first pushing rod 551 to move toward the end portion 531, the second pushing rod 553 moves with the first pushing rod 551, to cause the urging member 555 to move out of the sleeve 51. Then, the second inclined surfaces 5553 are engaged to the first inclined surfaces 5313 to firmly clamp the loading block 53 between the two supporting portions 512. In at least one embodiment, the second driving member 557 is a cylinder.

In an alternative embodiment, the second pushing rod 553 can be omitted. In this case, one end of each first pushing rod 551 is connected to the second driving member 557, and the other end of the first pushing rod 551 abuts against the corresponding urging member 555.

In at least one embodiment, each urging assembly 55 further includes an elastic member 554 coiled around the second pushing rod 553 and abutted against the loading block 53. The elastic element 554 is elastically compressed when the second pushing rod 553 moves toward the end portion 531, and rebounds to return the urging member 555 to its original position, thereby unloading the loading block 53 and the workpiece 200 from the supporting portions 512.

In at least one embodiment, the urging assemblies 55 can be omitted. In this case, the loading block 53 is fixed on the two supporting portions 512 such as by bolts for example.

Figure 3:
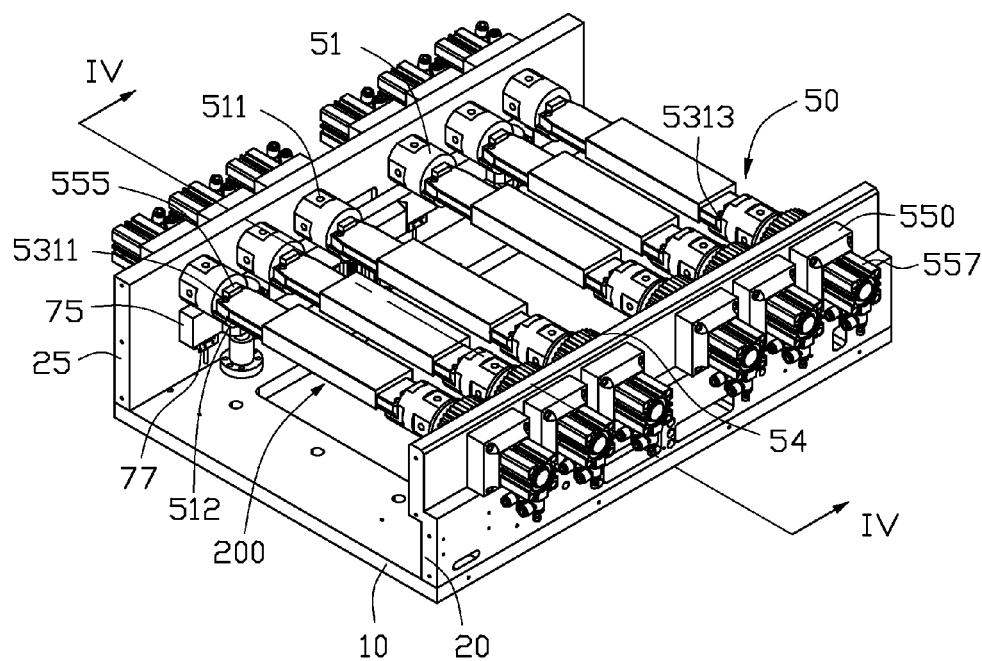
FIG. 3 is similar to FIG. 1, but showing the workpiece turning-over device in another perspective.

Referring to FIGS. 1-3, in at least one embodiment, each sleeve 51 defines a number of guide holes 511 around the periphery thereof. In detail, each sleeve 51 defines four guide holes 511 evenly around the periphery thereof. The workpiece turning-over device 100 further includes at least one positioning mechanism 70. In at least one embodiment, the turning-over device 100 includes two positioning mechanisms 70. However, the number of the positioning mechanism 70 can be varied. Each positioning mechanism 70 includes a third driving member 71, a lifting block 75, and a positioning assembly 77.

The third driving member 71 is secured on the base 10, and is able to drive the lifting block 75 to move toward and away from base 10. In at least one embodiment, the third driving member 71 is a cylinder. In at least one embodiment, each positioning mechanism 70 further includes a guide base 73. The lifting block 75 is movably coiled around the guide base 73, and is able to move along the guide base 73 when driven by the third driving member 71.

Referring to FIGS. 4-5, the positioning assembly 77 includes a securing portion 771, a positioning member 773, and an elastic element 775. The securing portion 771 is secured to a surface of the lifting block 75 facing the base 10. The positioning member 773 is movably received in the lifting block 75, and includes a protruding post 7733 at a top thereof which is able to protrude out of the lifting block 75 and insert into one corresponding guide hole 511, thereby retaining the sleeves 51 at a desired position.

The positioning member 773 further includes a flange 7731 extending around the periphery protruding post 7733 and received in the lifting block 75. The elastic element 775 is coiled around the positioning post 7733, and abuts between the flange 7731 and the securing portion 771.

The positioning assembly 77 further includes a sensor 777. The sensor 777 is fixedly secured in the securing portion 771, and is aligned with the positioning post 7733. The sensor 777 senses the distance between the sensor 777 and the positioning post 7733.

When the sleeves 51 are rotating, the positioning post 7733 is pressed by the sleeves 51 to cause the elastic element 775 to be elastically compressed. Then, the distance between the sensor 777 and the positioning post 7733 is less than a predetermined distance. The elastic element 775 further rebounds to push the protruding post 7733 to insert into the corresponding guide hole 511. Then, the distance between the sensor 777 and the positioning post 7733 equals to the predetermined distance.

In this embodiment, the first driving member 39 further drives the gear 514 to rotate when the sensed distance is less than the predetermined distance, and stops driving the gear 514 to rotate when the sensed distance equals to the predetermined distance.

It is to be understood, even though information and advantages of the present embodiments have been set forth in the foregoing description, together with details of the structures and functions of the present embodiments, the disclosure is illustrative only; changes may be made in the details, especially in matters of shape, size, and arrangement of parts within the principles of the present embodiments to the full extent indicated by the plain meaning of the terms in which the appended claims are expressed.

What is claimed is:

1. A workpiece turning-over device for turning over a workpiece, the workpiece turning-over device comprising:
   a first mounting wall;
   a gear driving mechanism comprising a sliding rail, a sliding rod, a connecting block, a toothed bar and a first driving member, the sliding rail being connected to the first mounting wall, the sliding rod being slidably received in the sliding rail, the connecting block being connected to a surface of the sliding rod opposite to the first mounting wall, the toothed bar being connected to a surface of the connecting block opposite to the base, the first driving member being located on the base and connected to the sliding rod, and being able to drive the sliding rod to slide along the sliding rail, thereby allowing the toothed bar to slide with the sliding rod and move relative to the first mounting wall; and
   at least one rotation mechanism each comprising at least one sleeve and a gear, one of the at least one sleeve rotatably attached to the first mounting wall, a supporting portion extending from one end of each of the at least one sleeve to secure the workpiece thereon, the gear fixedly coiled around one of the at least one sleeve and engaged to the toothed bar, and able to rotate to rotate the sleeve fixed thereto when the first driving member drives the toothed bar to move, thereby allowing the workpiece to rotate.

2. The workpiece turning-over device of claim 1, wherein the first driving member is a cylinder.

3. The workpiece turning-over device of claim 1, further comprising a base and a second mounting wall, wherein the first mounting wall and the second mounting wall are secured to two opposite ends of the base, and substantially parallel to each other; the gear driving mechanism is arranged between the first mounting wall and the second mounting walls; each of the at least one rotation mechanism comprises two sleeves rotatably inserted through the first mounting wall and the second mounting wall, respectively; two supporting portions extending from the two sleeve secure the workpiece therebetween; the gear is fixedly coiled around one sleeve which inserts through the first mounting wall.

4. The workpiece turning-over device of claim 3, wherein the sliding rail is connected to a surface of the first mounting wall facing the second mounting wall.

5. The workpiece turning-over device of claim 3, wherein each rotation mechanism further comprises a loading block positioned on the two supporting portions; and the workpiece is secured by the loading block.

6. The workpiece turning-over device of claim 5, wherein each supporting portion comprises at least one positioning post; the loading block comprises two end portions each defining at least one positioning hole; and each positioning post is able to insert into the corresponding positioning hole, thereby positioning the loading block on the two supporting portions.

7. The workpiece turning-over device of claim 6, wherein each end portion further comprises a first inclined surface; each rotation mechanism further comprises two urging assemblies each comprising a connecting base, a first pushing rod, an urging member, and a second driving member; the first pushing rod and the urging member of each urging assembly are movably received in the corresponding sleeve; the two connecting bases are secured to the first and the second mounting walls, and aligned with the two sleeves; one end of each first pushing rod passes through the corresponding connecting base and is then connected to the second driving member, the other end of the first pushing rod directly or indirectly abuts against the urging member; each urging member faces the corresponding supporting portion, and comprises a second inclined surface; when each second driving member pushes the first pushing rod to move toward the end portion, the urging member moves out of the sleeve to cause the second inclined surfaces to be engaged to the first inclined surfaces and firmly clamp the loading block between the two supporting portions.

8. The workpiece turning-over device of claim 7, wherein the second driving member is a cylinder.

9. The workpiece turning-over device of claim 7, wherein each urging assembly further comprises a second pushing rod movably received in the corresponding sleeve; one end of each first pushing rod is connected to the second driving member, and the other end of the first pushing rod abuts against one corresponding second pushing rod; and the urging member abuts against the second pushing rod.

10. The workpiece turning-over device of claim 9, wherein each urging assembly further comprises an elastic member coiled around the second pushing rod and abutted against the loading block; the elastic member is elastically compressed when the second pushing rod moves toward the end portion, and rebounds to return the urging member to its original position, thereby unloading the workpiece from the supporting portions.

11. The workpiece turning-over device of claim 1, wherein a one-way bearing is arranged between the gear and the sleeve, and is able to control the sleeves to rotate in only one direction.

12. The workpiece turning-over device of claim 3, further comprising at least one positioning mechanism, wherein each sleeve defines a plurality of guide holes around the periphery thereof; each positioning mechanism comprises a third driving member, a lifting block, and a positioning assembly; the third driving member is secured on the base, and is able to drive the lifting block to move toward and away from base; the positioning assembly comprises a securing portion, a positioning member, and an elastic element; the securing portion is secured to a surface of the lifting block facing the base; the positioning member is movably received in the lifting block, and comprises a protruding post at a top thereof which is able to protrude out of the lifting block and insert into one corresponding guide hole, thereby retaining the sleeves at a desired position.

13. The workpiece turning-over device of claim 12, wherein the positioning member further comprises a flange extending around the periphery protruding post and received in the lifting block; the elastic element is coiled around the positioning post, abuts between the flange and the securing portion, and is able to push the protruding post to insert into the corresponding guide hole.

14. The workpiece turning-over device of claim 13, wherein the positioning assembly further comprises a sensor fixedly secured in the securing portion and aligned with the positioning post; the sensor senses a distance between the sensor and the positioning post; the first driving member further drives the gear to rotate when the sensed distance is less than a predetermined distance, and stops driving the gear to rotate when the sensed distance equals to the predetermined distance.

15. The workpiece turning-over device of claim 14, wherein the third driving member is a cylinder.

16. The workpiece turning-over device of claim 12, wherein each positioning mechanism further comprises a guide base; the lifting block is movably coiled around the guide base, and is able to move along the guide base when driven by the third driving member.

17. A workpiece turning-over device for turning over a workpiece, the workpiece turning-over device comprising:
a base;
a first mounting wall;
a second mounting wall, wherein the first mounting wall and the second mounting wall are secured to two opposite ends of the base, and substantially parallel to each other;
a gear driving mechanism being arranged between the first mounting wall and the second mounting walls, and comprising a sliding rail, a sliding rod, a connecting block, a toothed bar and a first driving member, the sliding rail being connected to the first mounting wall, the sliding rod being slidably received in the sliding rail, the connecting block being connected to a surface of the sliding rod opposite to the first mounting wall, the toothed bar being connected to a surface of the connecting block opposite to the base, the first driving member being located on the base and connected to the sliding rod, and being able to drive the sliding rod to slide along the sliding rail, thereby allowing the toothed bar to slide with the sliding rod, the first driving member able to drive the toothed bar to move relative to the first mounting wall; and
at least one rotation mechanism each comprising two sleeves and a gear, two sleeves being rotatably inserted through the first mounting wall and the second mounting wall, respectively, one of the at least one sleeve rotatably attached to the first mounting wall, two supporting portions extending from the two sleeves secure the workpiece there between, the gear fixedly coiled around one sleeve which inserts through the first mounting wall and engaged to the toothed bar, and able to rotate the sleeve fixed thereto when the first driving member drives the toothed bar to move, thereby allowing the workpiece to rotate;

wherein each rotation mechanism further comprises a loading block positioned on the two supporting portions; and the workpiece is secured by the loading block;

wherein each supporting portion comprises at least one positioning post; the loading block comprises two end portions each defining at least one positioning hole; and each positioning post is able to insert into the corresponding positioning hole, thereby positioning the loading block on the two supporting portions.

18. The workpiece turning-over device of claim 17, wherein each end portion further comprises a first inclined surface; each rotation mechanism further comprises two urging assemblies each comprising a connecting base, a first pushing rod, an urging member, and a second driving member; the first pushing rod and the urging member of each urging assembly are movably received in the corresponding sleeve; the two connecting bases are secured to the first and the second mounting walls, and aligned with the two sleeves; one end of each first pushing rod passes through the corresponding connecting base and is then connected to the second driving member, the other end of the first pushing rod directly or indirectly abuts against the urging member; each urging member faces the corresponding supporting portion, and comprises a second inclined surface; when each second driving member pushes the first pushing rod to move toward the end portion, the urging member moves out of the sleeve to cause the second inclined surfaces to be engaged to the first inclined surfaces and firmly clamp the loading block between the two supporting portions.

19. A workpiece turning-over device for turning over a workpiece, the workpiece turning-over device comprising:
a base;
a first mounting wall;
a second mounting wall, wherein the first mounting wall and the second mounting wall are secured to two opposite ends of the base, and substantially parallel to each other;
a gear driving mechanism being arranged between the first mounting wall and the second mounting walls, and comprising a sliding rail, a sliding rod, a connecting block, a toothed bar and a first driving member, the sliding rail being connected to the first mounting wall, the sliding rod being slidably received in the sliding rail, the connecting block being connected to a surface of the sliding rod opposite to the first mounting wall, the toothed bar being connected to a surface of the connecting block opposite to the base, the first driving member being located on the base and connected to the sliding rod, and being able to drive the sliding rod to slide along the sliding rail, thereby allowing the toothed bar to slide with the sliding rod, the first driving member able to drive the toothed bar to move relative to the first mounting wall; and at least one rotation mechanism each comprising two sleeves and a gear, two sleeves being rotatably inserted through the first mounting wall and the second mounting wall, respectively, one of the at least one sleeve rotatably attached to the first mounting wall, two supporting portions extending from the two sleeves secure the workpiece there between, the gear fixedly coiled around one sleeve which inserts through the first mounting wall and engaged to the toothed bar, and able to rotate to rotate the sleeve fixed thereto when the first driving member drives the toothed bar to move, thereby allowing the workpiece to rotate;

at least one positioning mechanism, wherein each sleeve defines a plurality of guide holes around the periphery thereof; each positioning mechanism comprises a third driving member, a lifting block, and a positioning assembly; the third driving member is secured on the base, and is able to drive the lifting block to move toward and away from base; the positioning assembly comprises a securing portion, a positioning member, and an elastic element; the securing portion is secured to a surface of the lifting block facing the base; the positioning member is movably received in the lifting block, and comprises a protruding post at a top thereof which is able to protrude out of the lifting block and insert into one corresponding aide hole, thereby retaining the sleeves at a desired position.

20. The workpiece turning-over device of claim 19, wherein the positioning member further comprises a flange extending around the periphery protruding post and received in the lifting block; the elastic element is coiled around the positioning post, abuts between the flange and the securing portion, and is able to push the protruding post to insert into the corresponding guide hole.

\* \* \* \* \*